United States Patent [19]

Sugita

[11] Patent Number: 4,938,577
[45] Date of Patent: Jul. 3, 1990

[54] REAR-VIEW MIRROR PIVOTING APPARATUS FOR USE IN A VEHICLE

[76] Inventor: Masahiko Sugita, 8-24, Atago 3-chome, Niiza-shi, Saitama Prefecture, Japan, 352

[21] Appl. No.: 428,910

[22] Filed: Oct. 30, 1989

[30] Foreign Application Priority Data

Mar. 8, 1989 [JP] Japan ................................. 1-26328[U]

[51] Int. Cl.$^5$ ................................................ G02B 5/08
[52] U.S. Cl. ..................................... 350/605; 350/637; 248/479
[58] Field of Search ............... 350/605, 631, 632, 633, 350/637; 248/479, 480, 486

[56] References Cited

U.S. PATENT DOCUMENTS

| | | | |
|---|---|---|---|
| 3,972,597 | 8/1976 | Repay et al. | 350/634 |
| 4,475,414 | 10/1984 | Manzoni | 350/635 |
| 4,555,166 | 11/1985 | Enomoto | 350/634 |

FOREIGN PATENT DOCUMENTS

| | | | |
|---|---|---|---|
| 2579149 | 9/1986 | France | 350/637 |
| 8804619 | 6/1988 | PCT Int'l Appl. | 350/605 |

Primary Examiner—Bruce Y. Arnold
Assistant Examiner—Jay Ryan
Attorney, Agent, or Firm—Nixon & Vanderhye P.C.

[57] ABSTRACT

A rear-view mirror pivoting apparatus according to the present invention reflects a dead angle portion generated in the direction in which a vehicle makes a turn.

The mirror pivoting apparatus includes a mounting arm mounted on a car body a, a mirror box supported on the arm, a mirror pivotally supported on an open side of the mirror box by hinges, a crank arm whose one end is supported on the mirror, the other end thereof being pivotally supported by a crank piece, an electric motor with a reduction gear which rotates the crank piece, electrically insulated wires through which current is supplied from a power a source to said motor through a winker switch provided on the car body, and a mirror returning switch for short-circuiting the winker switch only when the mirror is pivoted.

1 Claim, 9 Drawing Sheets ically increased, which is however inconvenient and dangerous to a driver.

Furthermore, since the crank shaft is inserted into the through-hole formed in the supporting plate extending from the mirror with the bearing therebetween, said supporting plate is readily rattled, and said mirror connected to said supporting plate readily moves due to the swing or vibrations of the car body making it difficult for the driver to check the rear view of the vehicle.

REAR-VIEW MIRROR PIVOTING APPARATUS FOR USE IN A VEHICLE

BACKGROUND OF THE INVENTION

1. Field of the Invention:

The present invention relates to a rear-view mirror pivoting apparatus for use in a vehicle, and more particularly, to a rear-view mirror of the type which pivots a rear-view mirror supported in such a manner that it can pivots relative to a mirror box once in 2 seconds so as to eliminate a dead angle which cannot be viewed when a vehicle is turned to the left or the right and in which the rear-view mirror is automatically returned to a position at which it is used to view the rear of the vehicle after the vehicle has turned to the left or the right.

2. Description of the Related Art:

Japanese Utility Model No. 58-20421 filed by the present inventor proposes a left-turn rear-view mirror of the above-described type for use in a heavy-duty vehicle.

This conventional technique concerns a rear-view mirror through which a seat-occupant can view the dead angle portion generated on the left side of a vehicle when the vehicle makes a turn, in particular, when a heavy-duty vehicle makes a left turn; wherein it is characterized in that the mirror includes a casing whose upper end is closed by a lid plate and is opened at its front; a mirror disposed on the open side of the casing with its upper end rotatably supported on the lid plate by a shaft and its lower end supported on the lower end of the casing by a shaft; a supporting plate extending at the central portion of the casing in the horizontal direction with its one end fixed to a backing plate affixed on too the back side of the mirror, a spring being extended between the other end of the supporting plate and the back side of the casing; a motor fixed in such a manner that a shaft of the motor hangs from the under surface of the lid plate; and a crank shaft connected to the rotary shaft of the motor, the lower end of the crank shaft being received by an elliptical through-hole formed in the supporting plate with a bearing therebetween. The mirror is further characterized in that it has an upper flat portion, a lower curved portion bent toward the casing and the right and the left portions both curved toward the casing, the motor being connected to an energizing means for operating the motor in connection with the left turn signal provided on the side of the driver's seat.

In the above-described conventional rear-view mirror, the motor and the crank shaft for moving the mirror are directly coupled with each other without a reduction mechanism provided therebetween so as to allow the mirror to be returned by the spring.

Furthermore, the crank shaft is required to rotate against the urging force of the spring.

In consequence, an expensive low-speed, large-torque rotary motor, such as a multipolar synchronous motor or a step motor, is required.

Furthermore, since the mirror is pivotally supported on the casing at the latitudinal center thereof, it reflects only the car body, the view right behind thereof and the narrow left range near the car body, when it is pivoted.

In order to widen its range of vision, the angle of deflection of the pivot must be made sufficiently large and the deflecting speed of the pivot must be suffi-

SUMMARY OF THE INVENTION:

Accordingly, an object of the present invention is to provide a rear-view mirror pivoting apparatus which employs a direct-coupled type mirror driving mechanism including an inexpensive conventional DC motor with a reduction gear consisting of a worm gear, a worm wheel and so on connected to the motor so as to reduce the production cost, which enables preventing any useless action of the mirror and with its one end pivoted, it ensures a wider range of the rear-view of the car body on the side to which the vehicle makes a turn even if the angle of deflection of the mirror is small.

To this end, the present invention provides a rear-view mirror pivoting apparatus including a mounting arm mounted on a car body a, a mirror box supported on the arm, a mirror pivotally supported by hinges on an open side of the mirror box, a crank arm whose one end is supported on the mirror, the other end thereof being pivotally supported by a crank piece, an electric motor with a reduction gear which rotates the crank piece, electrically insulated wires through which current is supplied from a power source to the motor through a winker switch provided on the car body, and a mirror returning switch for short-correcting the winker switch only when the mirror is pivoted.

The mirror pivotally supported on the open side of the mirror box supported on the car body through the mounting arm can be pivoted through the crank piece and the crank arm by the rotational force of the electric motor with the reduction gear toward the dead angle portion generated when the vehicle makes a turn.

Furthermore, excepting the case where the car is making a turn, the mirror can be automatically returned right to its normal position in the running mode or stoppage mode by supplying current to the motor from the power source through the winker switch and the electric wires and by short-circuiting the winker switch through the mirror returning switch only when the mirror is pivoted.

DESCRIPTION OF THE PREFERRED EMBODIMENTS:

The present invention will be described now by means of examples with reference to the accompanying drawings.

Figure 1A:
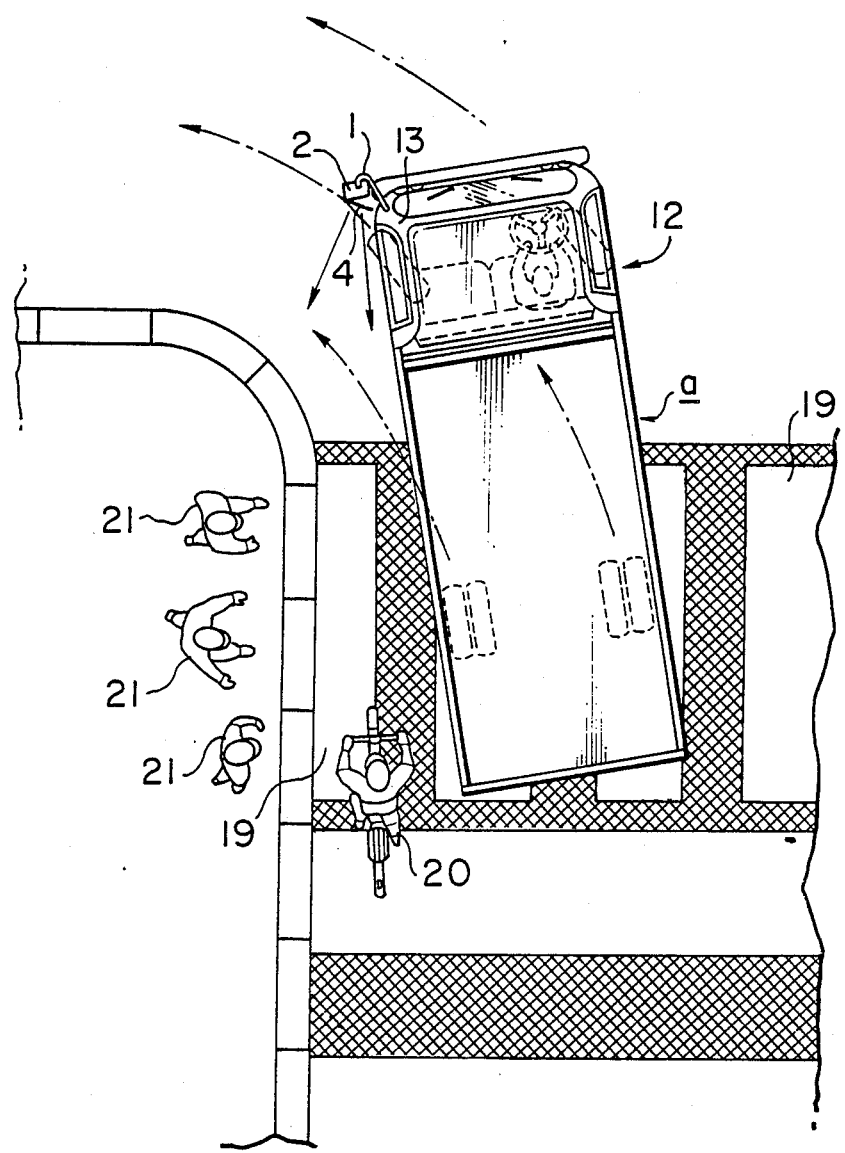
FIGS. 1 (a) and 9 (b) are plan views of a heavy-duty vehicle with a rear-view mirror pivoting apparatus according to the present invention mounted thereon in a state where it is making a turn.
Figure 1B:
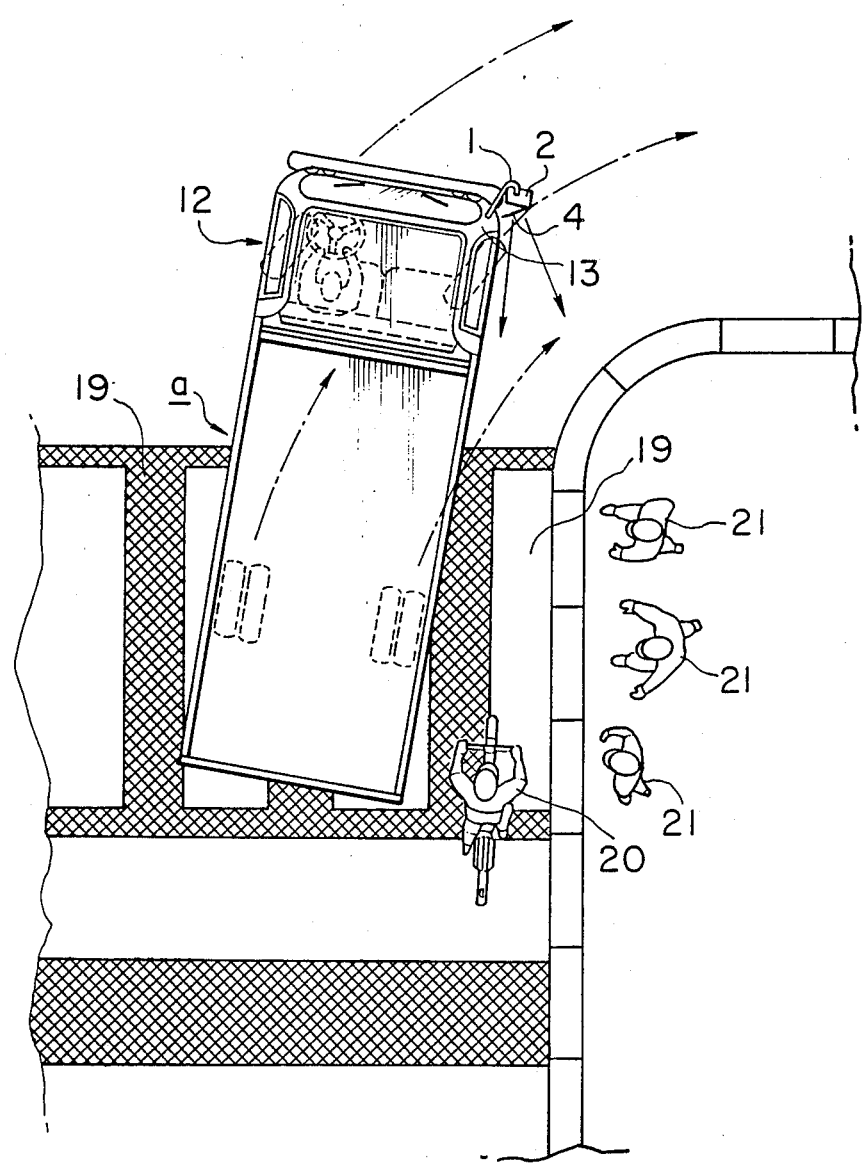

A rear-view mirror pivoting apparatus according to the present invention is basically used by a seat-occupant of a vehicle when he or she views the dead angle portion generated on the left side of a car body a of the heavy-duty vehicle when it makes a left turn, as shown in FIG. 1 (a), or that generated on the right side when it makes a right turn, as shown in FIG. 1 (b).

Figure 2:
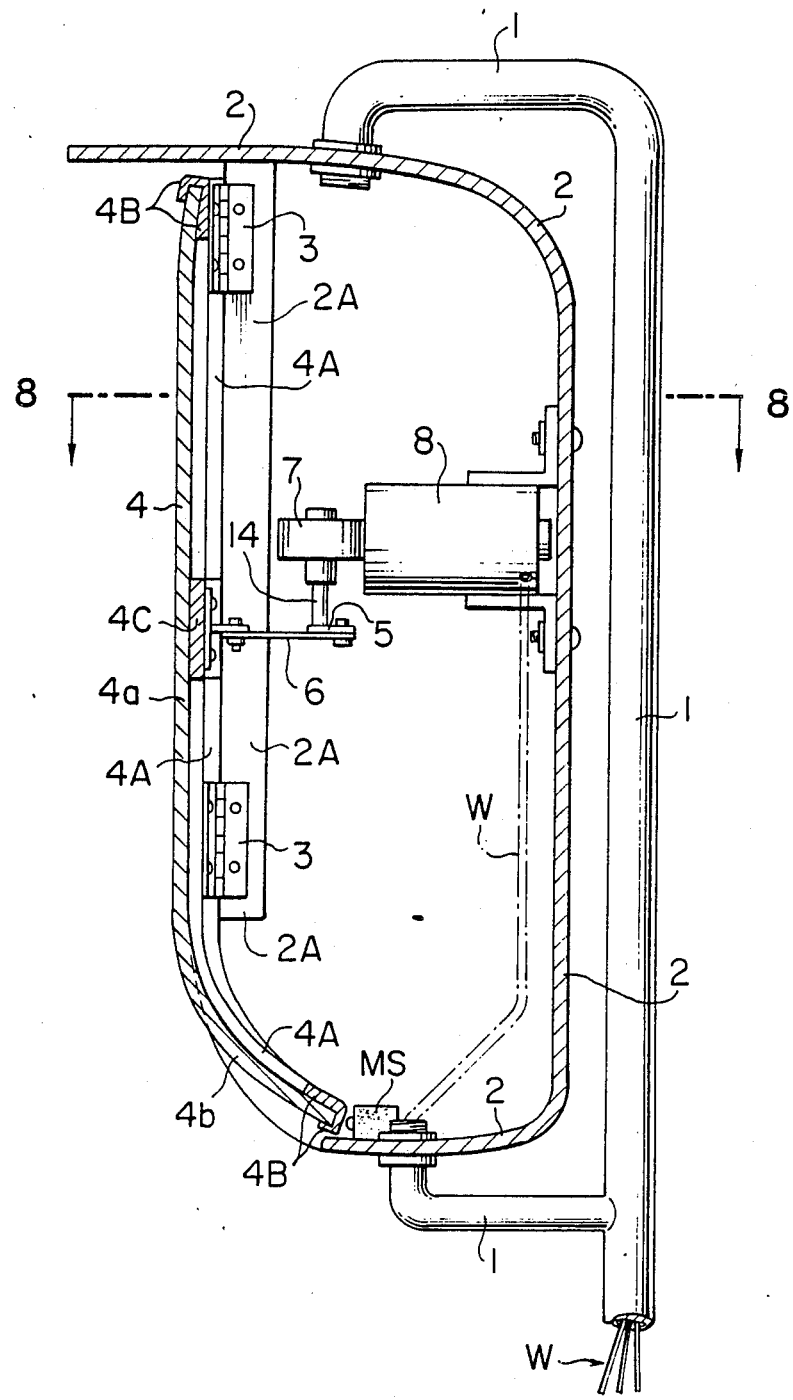
FIG. 2 is a vertical cross-sectional view of the essential parts of the rear-view mirror pivoting apparatus according to the present invention.
Figure 3:
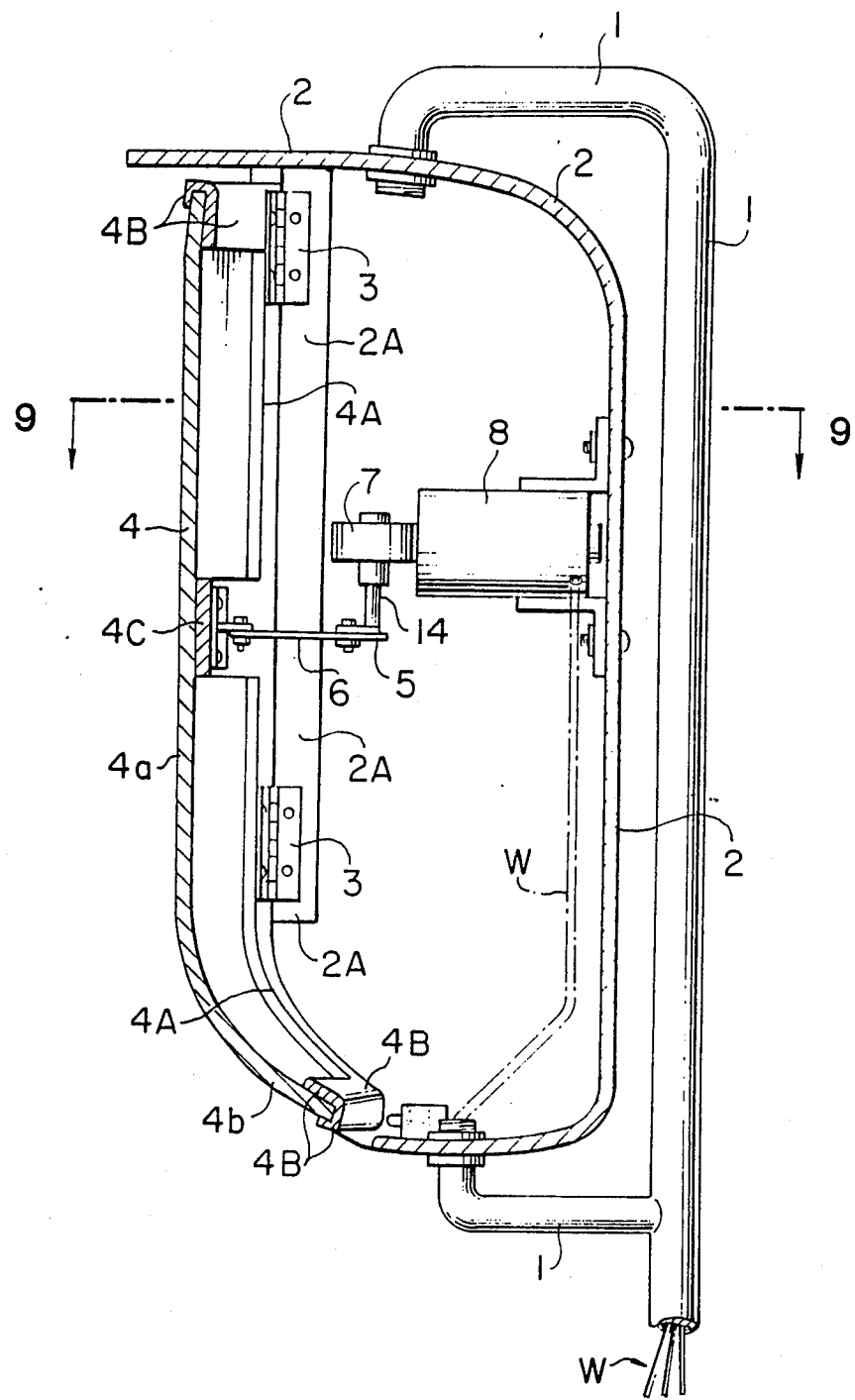
FIG. 3 is a view similar to FIG. 2, showing the rear-view mirror pivoting apparatus in a state different from that shown in FIG. 2.
Figure 4:
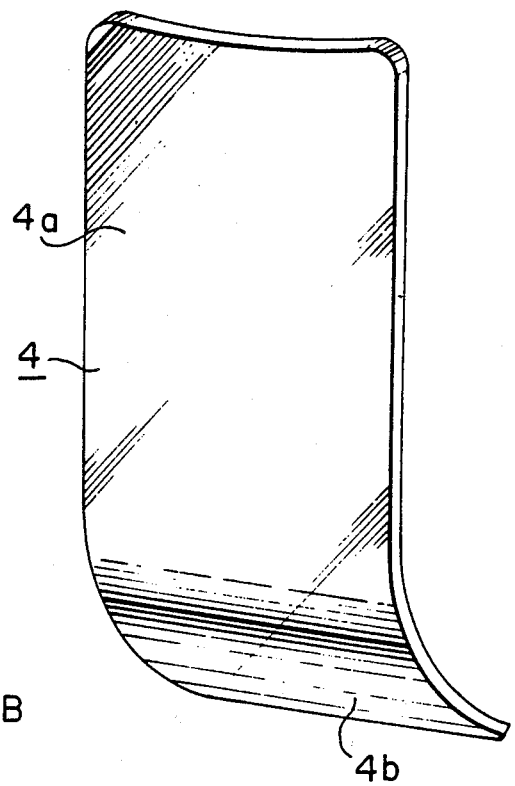
FIG. 4 is a perspective view of a mirror.
Figure 5:
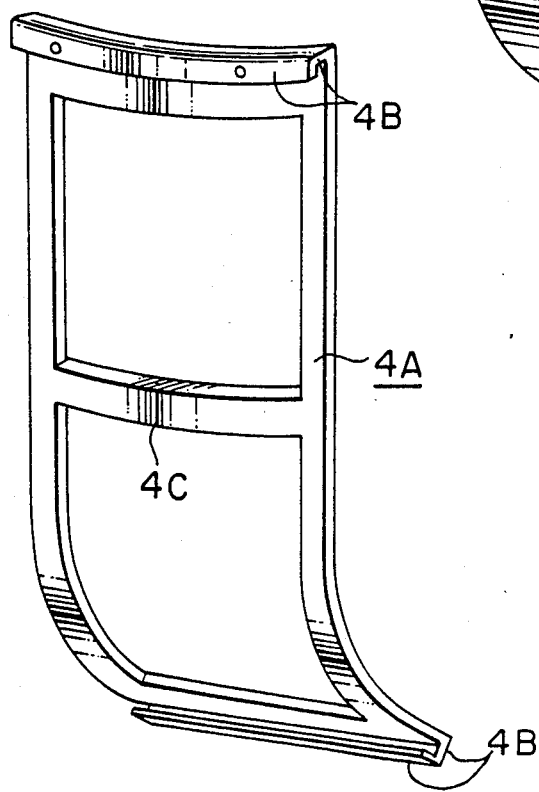
FIG. 5 is a perspective view of a mounting frame.

In this rear-view mirror pivoting apparatus, a mirror box 2 is mounted on a mounting arm 1 which is in turn mounted on a left front pillar 13 of the car body a in the manner shown in FIG. 2 and 3, and a mirror 4 shown in FIG. 4 is pivotally supported on an open side 2A of the mirror box 2 by hinges 3 with a mounting frame 4A shown in FIG. 5 therebetween. One end of a crank arm 6 is supported on the mirror 4 or the mounting frame 4A.

The other end of the crank arm 6 is pivotally supported on a crank piece 5, as shown in FIG. 2 and 3.

Figure 6:
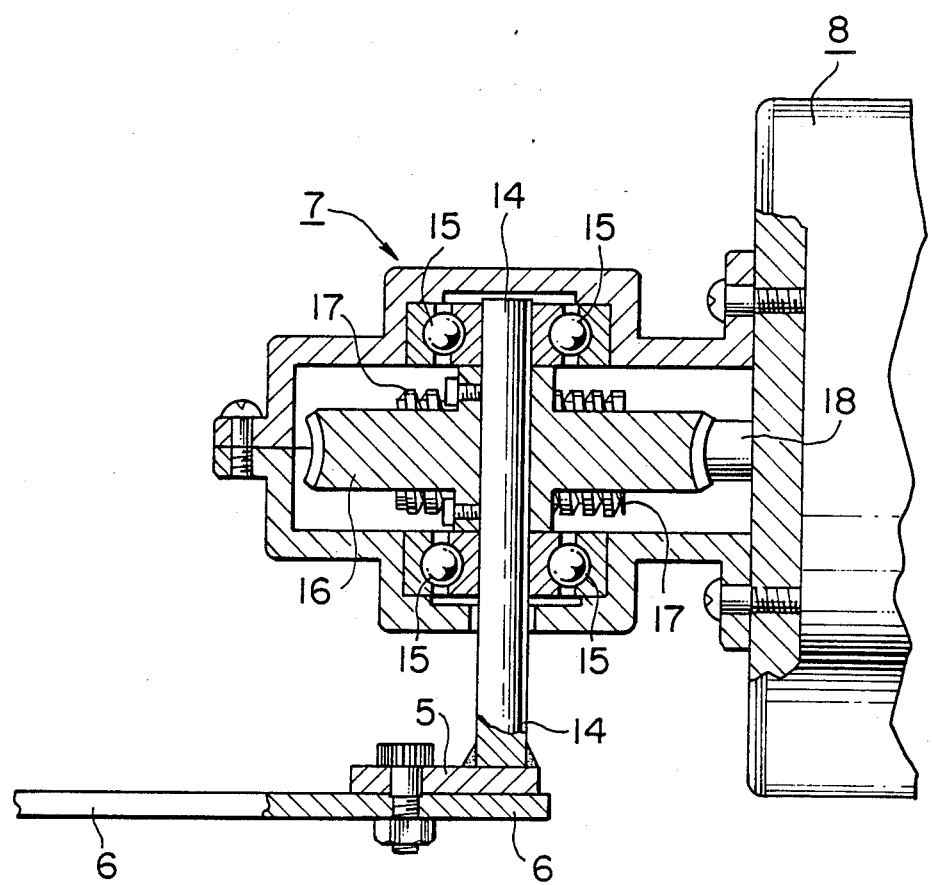
FIG. 6 is a cross-sectional view of a reduction gear.

A motor 8 with a reduction-gear 7 consisting of a worm gear, a worm wheel and so on shown in FIG. 6 is provided within the mirror box 2 for rotating the crank piece 5.

Figure 7A:
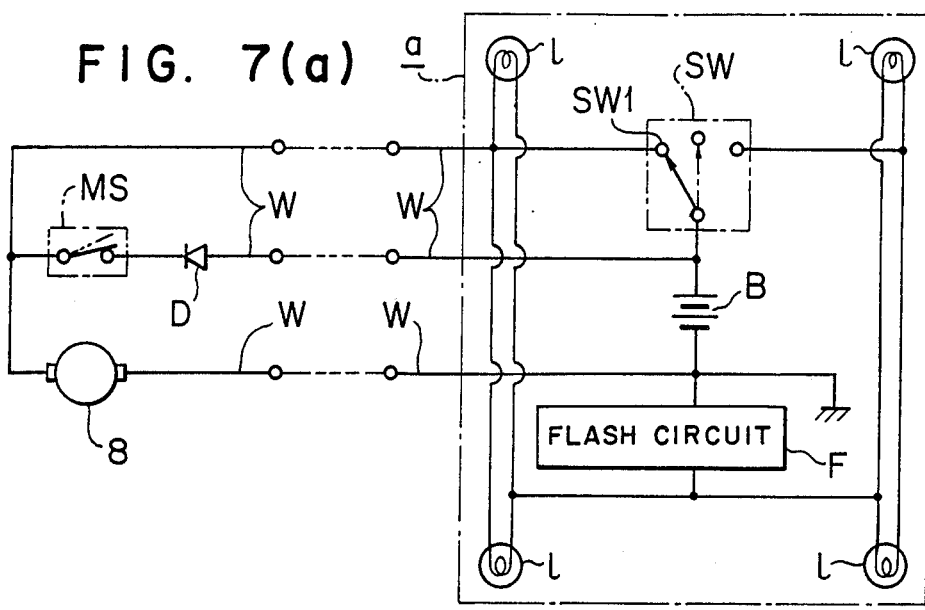
FIG. 7 (a) and 7 (b) are respectively circuit diagrams of the essential parts of an electric system suitable for use in the apparatus according to the present invention.
Figure 7B:
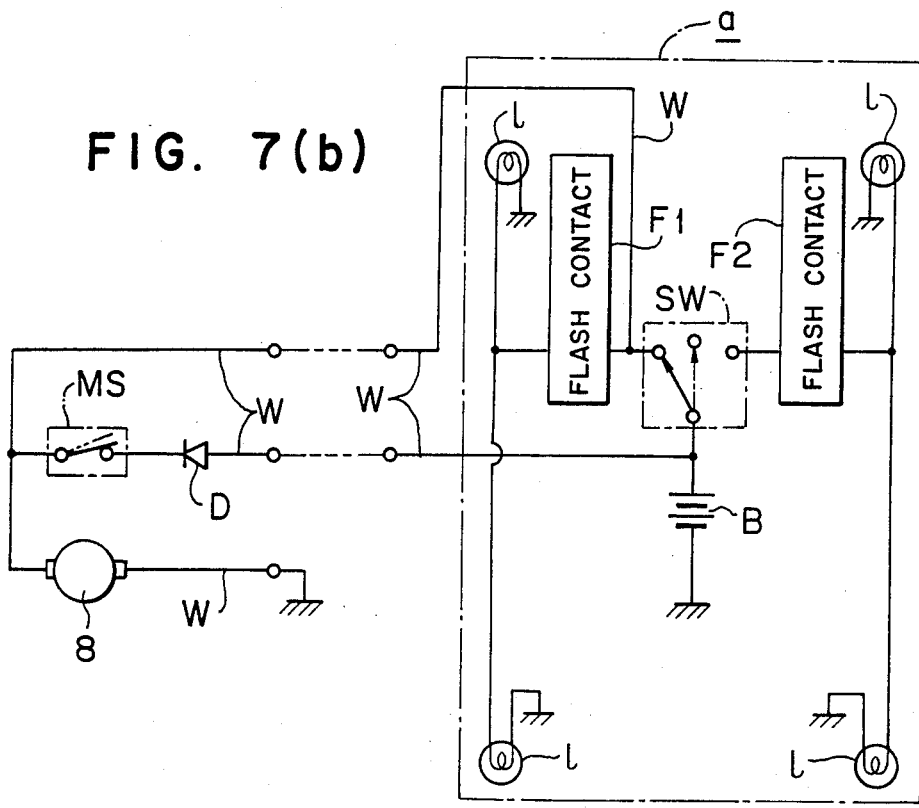

The electric system of the motor 8 includes two electrically insulated wires through which current is supplied to the motor 8 from a power source B through a winker switch SW provided on the car body a, and a mirror returning switch MS for short-circuiting the winker switch SW through the electric wires W only when the mirror 4 is pivoted, as shown in FIG. 7 (a).

Figure 8:
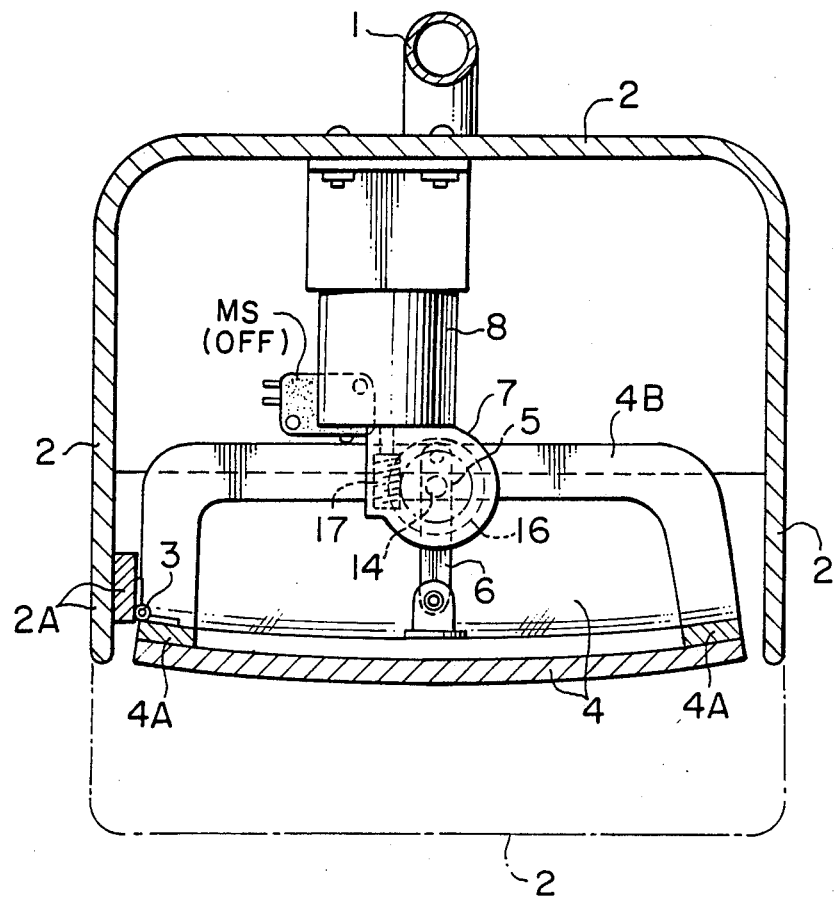
FIG. 8 is a section taken along the line A—A of FIG. 2.
Figure 9:
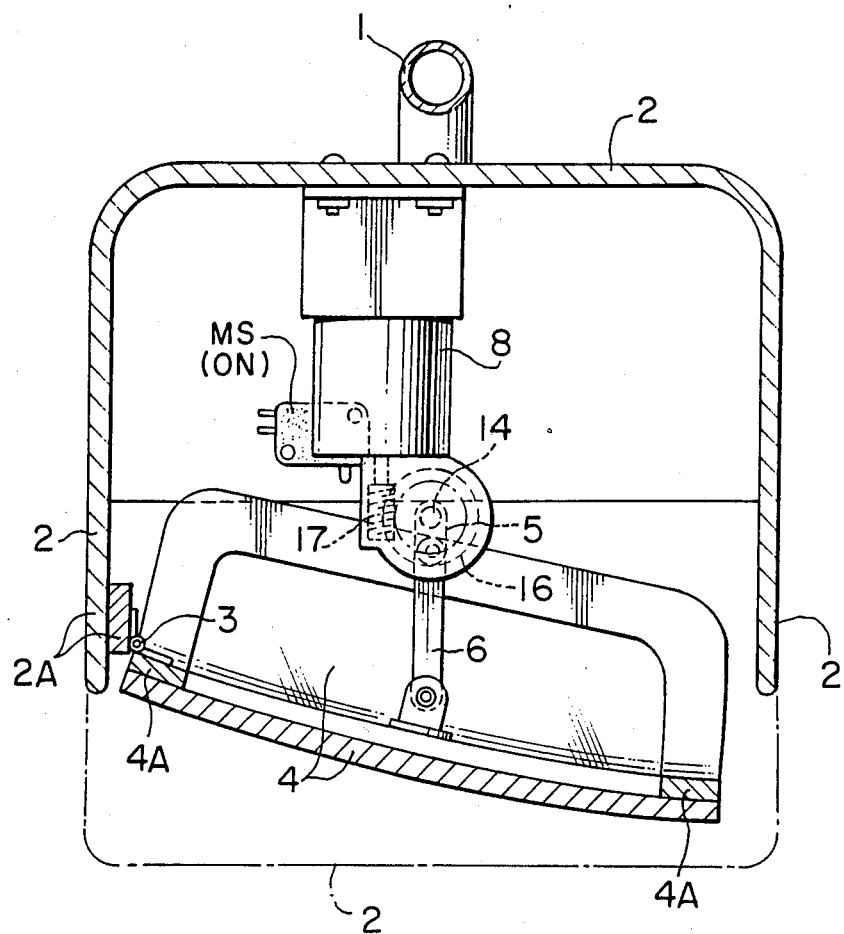
FIG. 9 is a section taken along the line B—B of FIG. 3.

The mirror returning switch MS is disposed on the inner surface of the lower portion of the mirror box 2 at which it is turned off by the mirror 4 which is not pivoted, as shown in FIG. 2 and 8, and at which it is turned on by the mirror 4 which is pivoted, as shown in FIG. 3 and 9.

Next, the practical form of the rear-view mirror pivoting apparatus according to the present invention will be described below.

Turning to FIG. 1 (a) and 1 (b) which respectively show a heavy-duty vehicle with the rear-view mirror pivoting apparatus according to the present invention in a state where it is making left and right turns, the upper and lower portions of the mirror box 2 are supported on the mounting arm 1 extending from the pillar 13 located on the left or right side of a driver's seat 12 of the car body a of a heavy-duty vehicle which is shown as the heavy-duty truck in this embodiment.

Inside the mirror box 2, the mounting frame 4A shown in FIG. 5 is mounted on the open side 2A of the mirror box 2 by the hinges 3, as shown in FIGS. 2 to 9, and the mirror 4 shown in FIG. 4 is received by mirror receiving portions 4A located at the upper and lower portions of the mounting frames 4A.

One end of the crank arm 6 is pivotally supported on a connecting piece 4C located substantially at the center of the mounting frame 4A, and the other end thereof is connected to the crank piece 5, which is fixed to an output shaft 14 of the reduction gear 7 shown in FIG. 6.

The mirror 4 is pivoted by the crank arm 6 through the crank piece 5 which is rotated by the rotation of the output shaft 14 of the motor 8.

In FIG. 6, a reference numeral 15 denotes bearing, 16 denotes wheel, and 17 denotes a worm gear.

In FIG. 7, a reference symbol D denotes a diode, W denotes electrically insulated wires, B denotes a power source, and denotes winker lamps.

In FIGS. 1 (a) and 1 (b), a reference numeral 19 denotes a pedestrian crossing, 20 denotes a moving body located at the back of the vehicle 12, and 21 denotes pedestrians.

The site at which the mirror returning switch MS is mounted is not limited to that shown in this embodiment.

The mirror returning switch MS may be replaced by a rotary switch provided at a site at which it is connected to the output shaft 14 of the reduction gear 7 or by a microswitch provided at a position at which it can catch the movement of the crank piece 5, the crank arm 6 or the like.

Next, how the rear-view mirror pivoting apparatus according to the present invention operates when the vehicle goes straight on and makes a left turn will be described.

First, while the heavy-duty vehicle is going ahead, the winker switch SW is not operated and is therefore off, deenergizing the electric motor 8.

More specifically, while the vehicle is going ahead, the winker switch SW is located at the off position shown by the dot-dashed line, and the mirror 4 is therefore maintained in a neutral state, which is suited to the straight running of the vehicle.

When the vehicle makes a left turn, a driver operates the winker switch SW to the position shown by the solid line in FIG. 7 (a) to generate a left turn signal. Concurrently with this, the motor 8 starts, and the rotational force thereof is transmitted to the crank piece 5 and then to the crank arm 6 through the rotational shaft 18 of the motor and the reduction gear 7, by which the mirror 4 starts to pivot about the hinges 3 at an angle of 10 to 15 degrees in a period of about 2 seconds.

This enables the driver to view the wider range of his of her rear left side.

In detail, a flat portion 4a of the mirror 4 reflects the rear left side of the vehicle, and a curved portion 4b of the mirror 4 reflects the downward rear left side, thus completely elimination the dead angle portion that cannot be viewed.

When the left turn is completed, the driver returns the steering wheel, and this returns the winker switch SW to the position indicated by the dot-dashed line in FIG. 7 (a). This in turn deenergizes the electric motor 8, and the mirror 4 is thereby stopped a that position regardless of the pivot angle.

In this invention, when the mirror 4 is at the position other than its normal position optimal to the straight running, the mirror returning switch MS shown in FIGS. 3 and 9 is turned on, as shown in FIG. 7 (a) and 9, so as to return the mirror 4 to its normal position which is optimal to the straight running shown in FIGS. 2 and 8.

More specifically, the mirror returning switch MS which may be a microswitch is provided at the lower open portion of the mirror box 2, as shown in FIG. 2, 3, 8 and 9.

In consequence, even when the winker switch SW is turned off in a state where the mirror 4 is being pivoted leftward, as shown in FIGS. 3 and 9, current can be kept supplied to the motor 8 through the mirror returning switch MS, as shown in FIG. 7 (a), to return to the mirror 4 to its normal position i.e., to its neutral position, as shown in FIG. 2 and 8. When the mirror 4 has returned to its normal position, the mirror returning switch SW is turned off, thus stopping the motor 8 and, hence, the mirror 4 at its normal position. In other words, even when the winker switch SW is turned off at any timing, the mirror 4 can be automatically returned to its normal position which is optimal to the straight running.

At the same time, the winker lamps can be switched off. The electric system shown in FIG. 7 (a) employs a single flasher circuit F for lighting and extinguishing the left and right turn signals.

However, it may also incorporate a flasher contact F1 for lighting and extinguishing the left turn signal and a flasher contact F2 for the right turn signal, as shown in FIG. 7 (b).

In that case, provision of an earth line can be omitted by grounding the individual components through the car body. The diode D shown in FIGS. 7 (a) and 7 (b) has the property of passing current in one direction and functions to extinguish the winker lamps immediately after the winker switch SW has been turned off regardless of the mirror returning switch SW.

It may be omitted.

In vehicles manufactured for export to the foreign countries where the traffic regulations differ from those in Japan, the rear-view mirror pivoting apparatus according to the present invention may be operated for the purpose of eliminating the dead angle portion generated when the vehicle makes a right turn, as shown in FIG. 1 (b).

The rear-view mirror pivoting apparatus according to the present invention has the following advantages:

The mirror pivotally supported on the open side of the mirror box supported on the car body through the mounting arm can be swinged through the crank piece and the crank arm by the rotational force of the electric motor with the reduction gear toward the dead angle portion generated when the vehicle makes a turn.

Furthermore, the mirror can be automatically located at its normal position in the running mode of stoppage made by supplying current to the motor from the power source through the winker switch and the electric wires and by short-circuiting the winker switch through the mirror returning switch only when the mirror is pivoted.

In consequence, in this mirror pivoting apparatus, since the mirror can be returned without using a mirror returning spring which is required in the conventional technique, no excessive load caused by the elastic force of the spring is applied to the motor, and the mirror can be operated by the output shaft of the reduction gear 7.

As a result, an inexpensive small DC motor can be adopted as the motor 8, which is advantageous in view of energy consumption and production cost.

Furthermore, since the mirror is pivoted by the output shaft of the reduction gear through the crank piece and the crank arm in a period of 2 seconds without any backlash, useless action of the mirror can be prevented, and the wider range of the side of the vehicle to which it is turned and the back thereof can be observed even when the angle of deflection (pivot) of the mirror is the same as that of the conventional mirror which is supported at the center thereof, which is advantageous in view of safe driving.

What is claimed is:

1. A rear-view mirror pivoting apparatus which reflects a dead angle portion generated in the direction in which a vehicle makes a turn, comprising:
   a mounting arm mounted on a car body;
   a mirror box supported on said arm;
   a mirror pivotally supported by hinges on an open side of said mirror box;
   a crank arm whose one end is supported on said mirror, the other end thereof being pivotally supported by a crank piece;
   an electric motor with a reduction gear to rotate said crank piece;
   insulated capsulated wires through which current is supplied from a power source to said motor by way of a winker switch provided on said car body; and
   a mirror returning switch to short-circuit said winker switch only when said mirror is pivoted.

* * * * *